(12) United States Patent
Verriet

(10) Patent No.: US 6,820,729 B2
(45) Date of Patent: Nov. 23, 2004

(54) SHOCK ABSORBER CYLINDER HEAD WIPER

(75) Inventor: Frank Verriet, Mississauga (CA)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/282,839

(22) Filed: Oct. 29, 2002

(65) Prior Publication Data

US 2004/0079602 A1 Apr. 29, 2004

(51) Int. Cl.$^7$ ................................................. F16F 9/36
(52) U.S. Cl. ................................................. 188/322.17
(58) Field of Search ...................... 188/322.17; 277/33, 277/35, 152, 153

(56) References Cited

U.S. PATENT DOCUMENTS

| | | | | |
|---|---|---|---|---|
| 4,166,523 A | * | 9/1979 | Fujii et al. | 188/322.17 |
| 4,291,788 A | * | 9/1981 | Kato | 188/322.17 |
| 4,438,834 A | * | 3/1984 | Handke et al. | 188/322.16 |
| 4,482,036 A | * | 11/1984 | Wossner et al. | 188/322.13 |
| 4,542,811 A | * | 9/1985 | Miura | 188/322.17 |
| 4,724,938 A | * | 2/1988 | Horvath | 188/382 |
| 5,178,243 A | * | 1/1993 | Hamada et al. | 188/322.17 |
| 5,211,268 A | * | 5/1993 | Lizell et al. | 188/281 |
| 5,305,859 A | * | 4/1994 | Davis | 188/282.1 |
| 5,441,132 A | * | 8/1995 | Pradel et al. | 188/315 |

FOREIGN PATENT DOCUMENTS

| | | | |
|---|---|---|---|
| JP | 3219134 | * | 9/1991 |
| WO | WO 93/12362 | * | 6/1993 |

* cited by examiner

Primary Examiner—Robert A. Siconolfi
Assistant Examiner—Devon Kramer
(74) Attorney, Agent, or Firm—Carlson, Gaskey & Olds, P.C.

(57) ABSTRACT

A vehicle shock absorber includes a piston rod. A cylinder head having a bore defining an axis supports the rod within the bore. A wiper, which preferably a hard plastic, is disposed within the cylinder head. The wiper has in inner surface that is in an interference fit with the rod. The wiper has spaced apart upper and lower contacts that are press fit to the rod. The inner surface tapers away from the upper and lower contacts to a generally central portion forming a cavity. The inner surface is spaced from the rod in the area of the cavity. In this manner, the interference between the wiper and rod is minimized forming only line contacts about the rod. The outer circumference of the wiper is preferably spaced from an annular pocket in the cylinder head receiving the wiper to permit the wiper to move laterally as its scraps debris from the rod. The cylinder head components are installed from the inner side of the cylinder head and a plate is press fit into the end of the cylinder head.

2 Claims, 1 Drawing Sheet

SHOCK ABSORBER CYLINDER HEAD WIPER

BACKGROUND OF THE INVENTION

This invention relates to a vehicle shock absorber, and more particularly, the invention relates to an apparatus for removing ice and debris from a shock absorber rod.

Vehicle shock absorbers such as those used in snowmobile and other cold weather applications may have problems of rod icing inhibiting proper operation of the shock absorber. Snow and ice become compacted around the shock absorber rod preventing the rod from moving in and out of the cylinder. Prior art devices have proposed a scraper to scrap the ice and other debris from the rod. However, these prior art devices utilize separate support rings and other components to support the scraper, which increases the dead length of the shock absorber and adds cost to the assembly.

Thick metal scrapers have been press fit to the rod. A large force must be applied to the rod to overcome the press fir of the scraper onto the rod, which is undesirable. The press fit between the scraper axis rod is along the entire inner surface of the scraper, which results in a rather large surface area requiring a large load to overcome the press fit. Furthermore, cylinder heads utilizing the scrapers have been rather difficult to assembly because they require numerous components to be retained in the cylinder head at both ends of the cylinder head. Specifically, many support or snap ring must be used at the ends of the cylinder at assembly. Therefore, what is needed is an improved scraper for a shock absorber.

SUMMARY OF THE INVENTION AND ADVANTAGES

The present invention provides a vehicle shock absorber including a piston rod. A cylinder head having a bore defining an axis supports the rod within the bore. A wiper, which preferably a hard plastic, is disposed within the cylinder head. The wiper has in inner surface that is in an interference fit with the rod. The wiper has spaced apart upper and lower contacts that are press fit to the rod. The inner surface tapers away from the upper and lower contacts to a generally central portion forming a cavity. The inner surface is spaced from the rod in the area of the cavity. In this manner, the interference between the wiper and rod is minimized forming only line contacts about the rod. The outer circumference of the wiper is preferably spaced from an annular pocket in the cylinder head receiving the wiper to permit the wiper to move laterally as its scraps debris from the rod. The cylinder head components are installed from the inner side of the cylinder head and a plate is press fit into the end of the cylinder head.

Accordingly, the above invention provides an improved scraper for a shock absorber.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
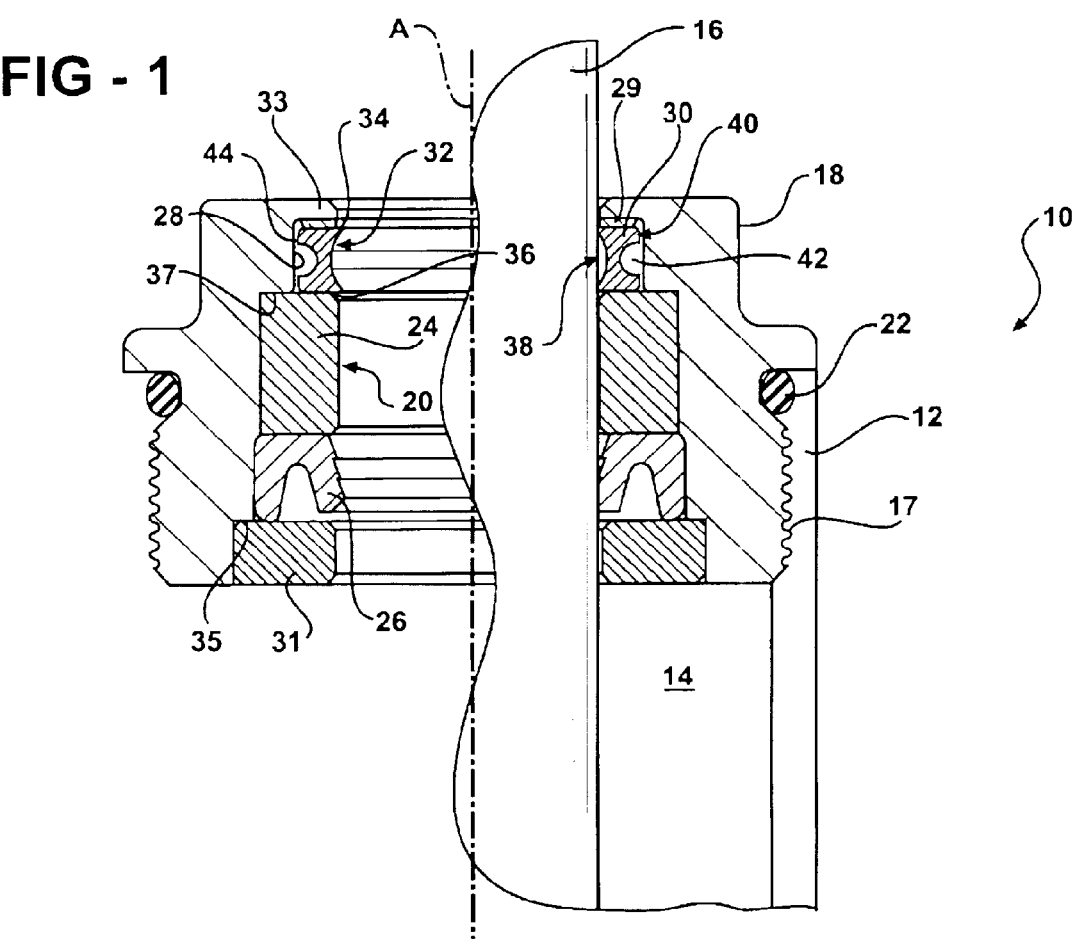
FIG. 1 is a cross-sectional view of the present invention wiper arrangements.
Figure 2:
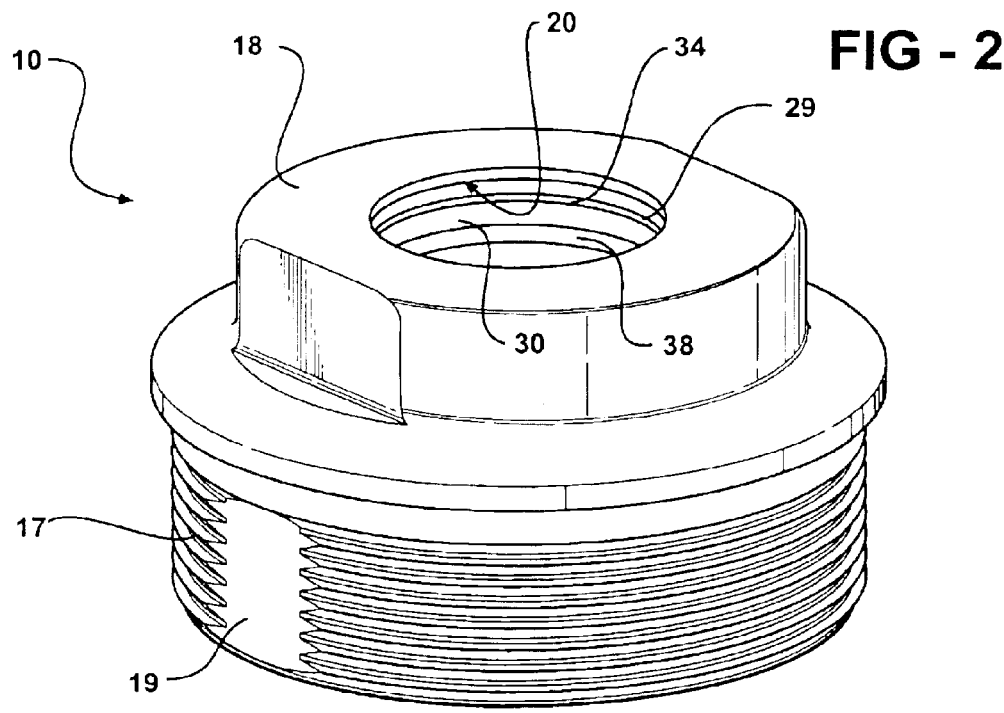
FIG. 2 is a perspective view of the cylinder head shown in FIG. 1.

The shock absorber 10 is shown in FIG. 1. The shock absorber 10 includes a housing 12 defining a fluid chamber 14. A rod 16 is disposed within the housing 12 and includes a piston (not shown) secured to an end of the rod 16 within the fluid chamber 14, as is well known in the art. The rod 16 moves along the axis A in response to an input from the vehicle. A cylinder head 18 is secured to the housing 12 at one end by a threaded portion 17. The threaded portion 17 may include flats 19, best shown in FIG. 2, to permit fluid out of the fluid chamber 14 and another fluid chamber (not shown).

The cylinder head 18 includes a bore 20 with the rod 16 slideably disposed within the bore 20 and preferably supported by a bushing 24. A seal 22 such as an O-ring is arranged between the cylinder head 18 and the housing 12 to retain the hydraulic fluid within the fluid chamber 14. The piston provides damping as it moves through the hydraulic fluid in the fluid chamber 14. A rod seal 26 is supported by the cylinder head 18 to retain the hydraulic fluid within the housing 12 as the piston moves through the fluid chamber 14 during assembly of the shock.

The cylinder head 18 includes an annular pocket 28 with the present invention wiper 30 arranged within the annular pocket 28. A seal 29 is arranged in the annular pocket 28 between the wiper 30 and a flange portion 33 extending inwardly toward the bore 20 from the cylinder head 18. The seal 29 and rod seal 26 are preferably formed from a rubber, urethane, or other suitable material. The wiper 30 is preferably formed from a hard plastic such as acetyl. The plastic may be selected or may incorporate a coating or additive to minimize the coefficient of friction. The bushing 24 may be formed from a powdered metal or coated journal bearing or other suitable arrangement.

For assembly, the seal 29 and wiper 30 are inserted into the annular pocket 28 with the seal 29 against the flange 33. The bushing 24 is inserted into the cylinder head 18 adjacent to the wiper 30. The rod seal 29 is inserted into the cylinder head. A plate 31 is press fit to the cylinder head 18 against a shoulder 35 to force the cylinder head components in the direction of the axis A and retain the components within the cylinder head 18. Alternatively, the plate 31 may be staked to the cylinder head 18. The seal 29 is compressed between the cylinder head 18 and the wiper 30 to form a watertight seal there between and to prevent the intrusion of water into the fluid chamber 14. Compression of the seal 29 is limited by a shoulder 37 against which the bushing 24 abuts.

The present invention provides an improved design with regard to machining and assembly. The cylinder head 18 may be machined from one side using a single pass machining operation, and the components may be assembled into the cylinder head 18 from the same end without re-fixturing the head. This is accomplished by using annular pockets or recesses of increasing diameter moving along the axis A from the exterior side of the head to the interior side of the head. As a result, one machining tool may be used and the components inserted from one side.

The wiper 30 includes an inner surface 32 adjacent to the outer surface of the rod 16. The inner surface 32 includes upper 34 and lower 36 contacts with a cavity 38 arranged there between. The wiper 30 has a protrusion less than a length of the inner surface 32 forming the contacts 34 and 36 between the wiper 30 and the rod 16. The inner surface 32 tapers inwardly away from the rod 16 to form the cavity 38 such that the inner surface 32 is spaced from the exterior surface of the rod 16 in the area of the cavity 38. The very small area of engagement between the wiper 30 and the rod 16 at the contacts 34 and 36 forming a line of contact with the at each of the contacts 34 and 36 limits the force that must be overcome as a result of the press fit between the wipers 30 and rod 16. The wiper acts to scrap debris such as ice from the rod and scraps excess water from the rod 16 prior to reaching the rod seal 26. It is to be understood that the profile of this inner surface 32 may be different than shown and that more or fewer than two lines of contact may be formed between the wiper 30 and rod 16. Furthermore, more than a line of contact may be used as long as the contact between the inner surface 32 and the rod 16 is minimized.

The wiper 30 includes an outer circumference 44 that is spaced from the cylinder bead 18 within annular pocket 28 to form a gap 40. In this manner, the wiper 30 is permitted to float laterally relative the cylinder head 18 to accommodate tolerances. The outer circumference 44 of the wiper 30 may include a recess 42 for receiving a seal (not shown) arranged between the wiper 30 and the cylinder head 18 providing a further water barrier.

The invention has been described in an illustrative manner, it is to be understood that the terminology that has been used is intended to be in the nature of words of description rather than a limitation. Obviously, many modifications and variations of the present invention are possible in light of the above teachings. It is, therefore, to be understood that within the scope of the appended claims the invention may be practiced otherwise than as specifically described.

What is claimed is:

1. A shock absorber cylinder head comprising:

a body having an exterior end and an opposite interior end with a central cavity defining a rod axis between said ends, said central cavity being defined by a plurality of concentric annular pockets each having a diameter with said diameters increasing from said exterior end to said interior end, said exterior end has a flange, and a first annular pocket adjacent said flange with a wiper disposed therein; and wherein a second annular pocket is arranged adjacent to said first annular pocket forming a first shoulder with a bushing disposed in said second annular pocket abutting said first shoulder, wherein a third annular pocket is arranged adjacent to said second annular pocket opposite said first annular pocket and forming a second shoulder with a plate fixedly disposed with third said annular pocket abutting said second shoulder.

2. The cylinder head according to claim 1, wherein a rod seal is arranged in said second annular pocket interposed between said bushing and said plate.

* * * * *